United States Patent [19]
Holt et al.

[11] Patent Number: 6,070,784
[45] Date of Patent: Jun. 6, 2000

[54] CONTACT BACKUP ROLLER APPROACH TO FSW PROCESS

[75] Inventors: Elmo S. Holt, Parker Dam, Ariz.; Larry J. Lang, Rowland Heights, Calif.

[73] Assignee: The Boeing Company, Seal Beach, Calif.

[21] Appl. No.: 09/112,037

[22] Filed: Jul. 8, 1998

[51] Int. Cl.[7] ............................. B23K 31/02; B23K 20/12
[52] U.S. Cl. .................... 228/112.1; 228/44; 228/49.3
[58] Field of Search ............................ 228/112.1, 44.5, 228/48, 49.3, 49.1; 219/60.7

[56] References Cited

U.S. PATENT DOCUMENTS

| | | | |
|---|---|---|---|
| 3,241,736 | 3/1966 | Nesmith | 228/44 |
| 3,949,896 | 4/1976 | Luc | 220/75 |
| 4,144,110 | 3/1979 | Luc | 156/73.5 |
| 4,542,276 | 9/1985 | Van Den Berg | 219/60 A |
| 5,285,947 | 2/1994 | Depperman | 228/49.3 |
| 5,444,902 | 8/1995 | Casturo et al. | 29/59.6 |
| 5,524,813 | 6/1996 | Pease | 228/212 |
| 5,769,306 | 5/1996 | Colligan | 228/112.1 |
| 5,813,592 | 9/1996 | Midling et al. | 228/112.1 |

FOREIGN PATENT DOCUMENTS

| | | | |
|---|---|---|---|
| 2306366 | 5/1997 | United Kingdom | 228/112.1 |

*Primary Examiner*—Patrick Ryan
*Assistant Examiner*—Lynne Edmondson
*Attorney, Agent, or Firm*—Harry B. Field; Christensen, O'Connor, Johnson & Kindness

[57] ABSTRACT

A welding apparatus (28) for forming a circumferential weld (56) includes a base (30) and a spindle (32) extending perpendicularly from the base. Along the spindle, at its proximal and distal portions, first and second workpiece supporters (38, 40) are provided, respectively, to position workpieces (42) to be welded together therebetween. Between the first and second workpiece supporters, a first arm (44) and a second arm (48) are provided, both extending perpendicularly from the spindle. To a distal end of the first arm, an internal backup roller (46) is rotatably attached, and to a distal end of the second arm, an internal drive roller (50) is rotatably attached. One or more external rollers (52a, 52b), each rotatably attached to an external support (66), are further provided. The internal and external rollers are driven by variable-speed programmable motors (not shown). In operation, the workpieces are mounted onto the apparatus, being sandwiched between the internal rollers and the external rollers. A friction stir welding tool (58) is positioned externally with its probe opposing the internal backup roller. As the programmable motors drive the rollers to continuously draw the workpieces between the friction stir welding tool and the internal backup roller, the friction stir welding tool forms a circumferential weld to join the workpieces together.

15 Claims, 5 Drawing Sheets

CONTACT BACKUP ROLLER APPROACH TO FSW PROCESS

FIELD OF THE INVENTION

This invention relates to an apparatus and method for friction stir welding, and more particularly, to an apparatus and method for friction stir welding together cylindrical, domelike, or flat members using a contact backup roller as a welding platen.

BACKGROUND OF THE INVENTION

Figure 1A:
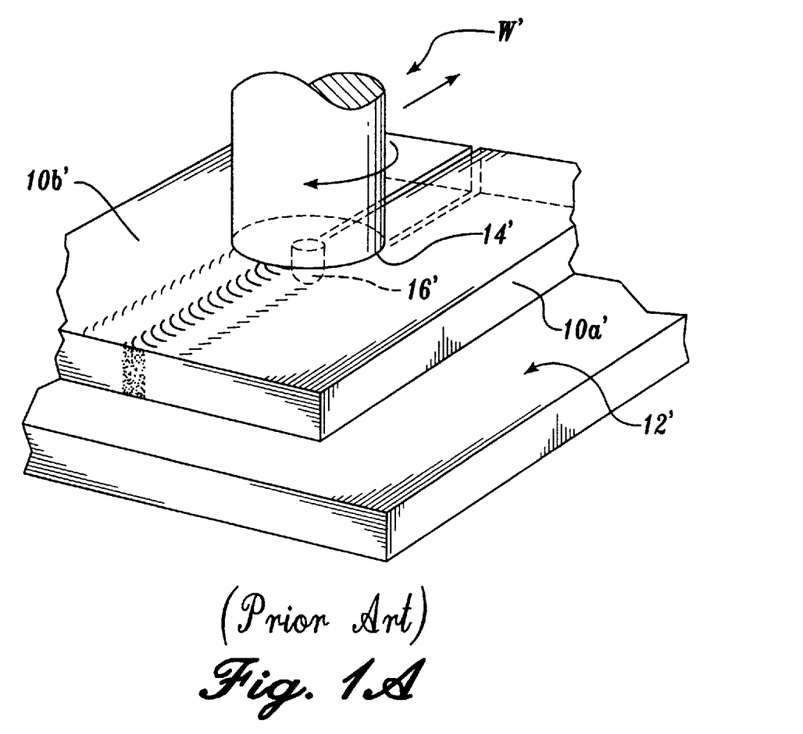
FIG. 1A is a schematic diagram illustrating a prior art friction stir welding process.
Figure 1B:
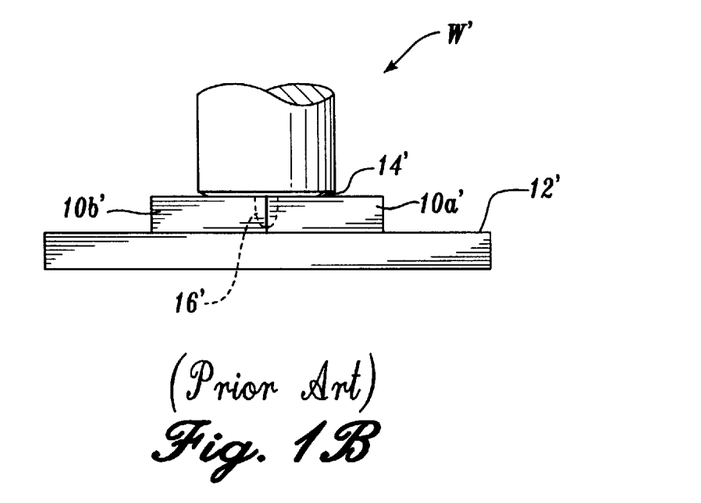
FIG. 1B is an end view of FIG. 1A.

Friction stir welding (FSW) is a relatively new welding process for joining together parts of materials such as metals, plastics, and other materials that will soften and commingle under applied frictional heat to become integrally connected. A detailed description of the FSW apparatus and process may be found in Patent Publications WO 93/10935 and WO 95/26254; and U.S. Pat. No. 5,460,317, all of which are herein fully incorporated by reference. One useful apparatus for FSW is shown in FIGS. 1A and 1B. As shown, two parts, exemplified by plates 10a' and 10b' on a backing plate 12', are aligned so that edges of the plates to be welded together are held in direct contact. An FSW tool W' has a shoulder 14' at its distal end, and a nonconsumable welding probe 16' extending downward centrally from the shoulder. As the rotating tool W is brought into contact with the interface between plates 10a' and 10b', the rotating probe 16' is forced into contact with the material of both plates, as shown. The rotation of the probe in the material and rubbing of the shoulder against the upper surface of the material produce a large amount of frictional heating of both the welding tool and the plate interface. This heat softens the material of the plates in the vicinity of the rotating probe and shoulder, causing commingling of material, which, upon hardening, forms a weld. The tool is moved longitudinally along the interface between plates 10a' and 10b', thereby forming an elongate weld along the interface between the plates. The welding tool's shoulder 14' prevents softened material from the plates from escaping upward, and forces the material into the weld joint. When the weld is completed, the welding tool is retracted.

Figure 2A:
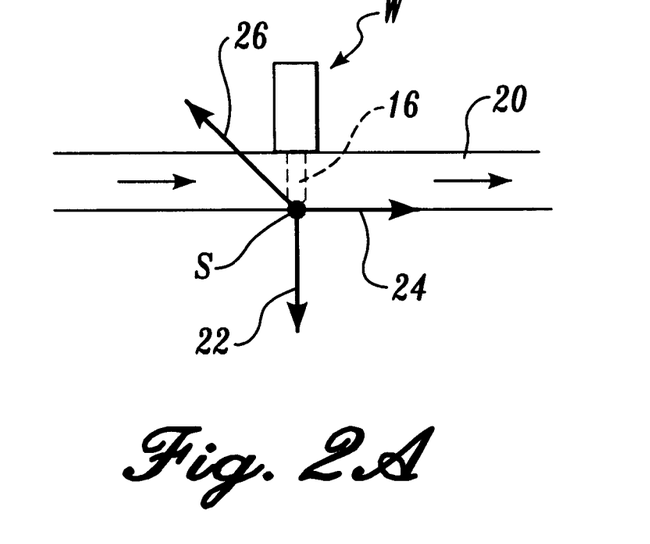
FIG. 2A is a force diagram illustrating forces created by friction stir welding together flat workpieces.
Figure 2B:
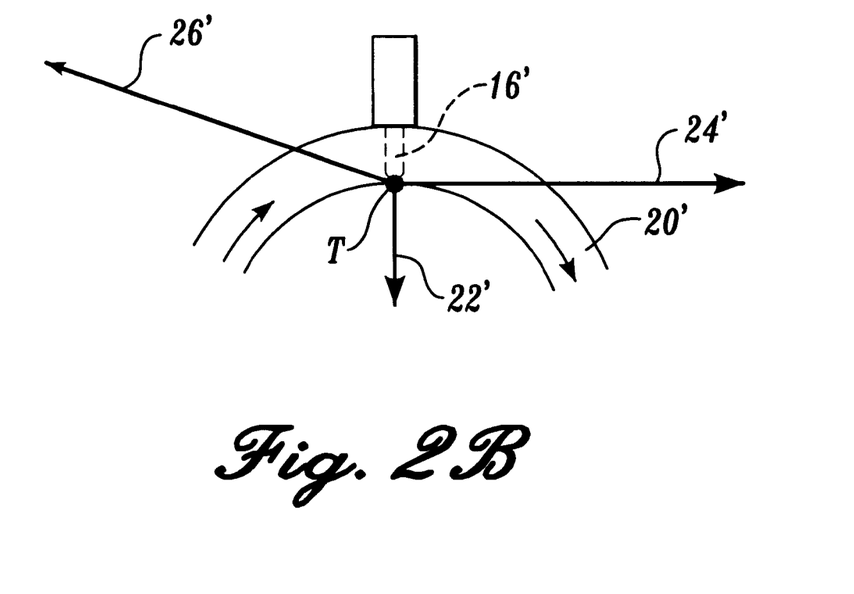
FIG. 2B is a force diagram illustrating forces created by friction stir welding together cylindrical or domelike workpieces along a circumferential weld line.

When FSW is used to weld together cylindrical or domelike workpieces, for example, when joining tank elements, a welding apparatus supporting the workpieces being joined must react to and oppose significant forces. FIG. 2A is a typical force diagram illustrating various forces that are created while welding flat workpieces together. Flat workpieces, collectively represented by 20, traverse in the direction of arrows shown, while an FSW tool W remains stationary. Arrow 22 represents a force applied to a point S beneath a rear surface of workpieces 20 by a probe 16 of the tool W, and arrow 24 represents a force applied to the point S by the transverse movement of workpieces 20. Arrow 26 is the minimum force required to oppose the combined forces represented by arrows 22 and 24. FIG. 2B, on the other hand, is a force diagram illustrating the forces created while welding cylindrical workpieces 20' together. Cylindrical workpieces 20' are rotated with respect to a probe 16' in the direction of arrows shown. As before, arrow 22' represents a force applied to a point T beneath a rear surface of workpieces 20' by the probe 16', and arrow 24' represents a force applied to the point T by the rotational movement of workpieces 20'. Finally, arrow 26' is the minimum force required to oppose the combined forces represented by arrows 22' and 24'. As better understood by comparing arrows 24 and 24' in FIGS. 2A and 2B, respectively, the rotary force encountered when forming a circumferential weld is significant. For example, the joining of 10 ft diameter cylindrical workpieces of ¼ inch thick Al—Li will typically encounter a radial force corresponding with arrow 24' of approximately 8,000 ft·lb. Reasonable design margins would then call for a welding apparatus capable of reacting the resultant force 26' and driving the rotating probe 16' into the material to be joined with at least two times the radial force, e.g., 20,000 ft·lb.

In the past, an expensive rigid ring has been used to react to the significant forces associated with friction stir welding a circumferential joint. The rigid ring is placed inside the cylindrical or domelike members to be welded together along a circumferential weld joint. A friction stir welding tool is then applied along the joint from outside. Upon completion of the welding process, the ring is disassembled and removed from inside the members. Since each ring is configured for a specific diameter, different rings, each with a specific diameter, are required for joining circumferential welds of different diameters. This significantly increases tool inventory costs.

Furthermore, the ring method as described above tends to create an offset between the materials being joined. As a friction stir welding tool is rotated and applied on the materials to be joined, usually at a slight angle, it produces forces that tend to lift the materials being joined off the ring, causing the weld offset. The weld offset also occurs in the formation of a straight longitudinal weld along flat workpieces, as illustrated in FIGS. 1A and 1B.

A need exists for an apparatus and method for opposing the significant forces associated with the friction stir welding together of cylindrical or domelike members. Preferably, such apparatus and method are capable of forming circumferential welds of variable diameters. Furthermore, a need exists for an apparatus and method for eliminating weld offset in forming a circumferential weld, as well as in forming a straight longitudinal weld.

SUMMARY OF THE INVENTION

The present invention provides a friction stir welding apparatus and method for joining together workpieces along a circumferential weld line, wherein significant forces associated with such welding are opposed by a single roller having a single contact point with the workpieces being joined together. The apparatus also eliminates the weld offset between the workpieces being joined. Examples of workpieces including a circumferential weld include cylindrical and domelike workpieces. The method of the invention to eliminate weld offset is also applicable in joining flat workpieces together involving a straight longitudinal weld.

A preferred embodiment of the welding apparatus of the invention includes a base and a spindle extending perpendicularly from the base. Along the spindle, at its proximal and distal portions, first and second workpiece supporters are provided, respectively, to position workpieces to be welded together therebetween. Between the first and second workpiece supporters on the spindle, a first arm is provided extending perpendicularly from the spindle. An internal backup roller is rotatably attached to a distal end of the first arm. Also between the first and second workpiece supporters on the spindle, a second arm is provided extending perpendicularly from the spindle. An internal drive roller is rotatably attached to a distal end of the second arm. The apparatus further includes one or more external rollers, each rotatably attached to an external support. The internal and/or external rollers are driven by variable-speed programmable motors. The first and second arms may have adjustable length and, further, may be attached to the spindle in a pivotally and slidably adjustable manner. One or two external rollers may be positioned adjacent the internal backup roller to minimize the welding offset between the workpieces being joined. Furthermore, several external rollers may be positioned so that each opposes an internal drive roller to retain the workpieces together therebetween.

Onto the welding apparatus as described above, cylindrical or domelike workpieces to be welded together are coaxially mounted, with their axes being aligned with the spindle, between the first and second workpiece supporters. The workpieces are sandwiched between the internal rollers and the external rollers, with a proposed weld line preferably roughly aligned with a middle circumference of each of the rollers. A friction stir welding tool is positioned externally with its probe on the proposed weld line and opposing the internal backup roller. As the programmable motors drive the internal and/or external rollers to continuously feed the workpieces between the friction stir welding tool and the internal backup roller, the friction stir welding tool, which itself is held stationary, forms a weld along a circumference of the workpieces being joined together. In the alternative, the apparatus may be configured so as to hold stationary the workpieces to be joined, while the apparatus, together with a friction stir welding tool, is rotated about the workpieces to form a circumferential weld.

A method of friction stir welding cylindrical or domelike workpieces together by forming a circumferential weld is also provided. The method includes providing a friction stir welding tool, providing a welding apparatus of the present invention, and positioning the workpieces to be welded together onto the apparatus. The method further includes forming a circumferential weld to join the workpieces together by rotating the rollers of the apparatus so that the workpieces are continuously drawn between the friction stir welding tool and the internal backup roller, or so that the friction stir welding tool and the apparatus rotate about the workpieces which are held stationary. Finally, the method includes, upon completion of the welding process, removing the welded workpieces from the apparatus.

A further embodiment of the present invention includes a method for welding together flat workpieces without creating a weld offset. The method includes providing a backup roller and one or more first rollers that are all disposed in parallel with each other and rotatably supported. The rollers are coupled to programmable motors. On the backup and first rollers, flat workpieces to be joined are placed, with a proposed weld line preferably roughly aligned with a middle circumference of each of the rollers. On the flat workpieces, one or more second rollers are placed, with the proposed weld line aligned in the same manner as above. The second rollers are rotatably supported and may be coupled to programmable motors. A friction stir welding tool is positioned on the same side as the second rollers with its probe on the proposed weld line and opposing the backup roller. As the motors drive the rollers to continuously feed the flat workpieces between the friction stir welding tool and the backup roller, the friction stir welding tool forms a longitudinal weld without weld offset.

The friction stir welding apparatus and method of the present invention provide several advantages over the current approach in welding together cylindrical, domelike, or flat workpieces. First, the present invention does not require any additional material, such as an expensive rigid ring used in forming a circumferential weld and, thus, lowers material and operational costs involved. Second, when the first and second arms having adjustable length are used, the welding apparatus of the invention can be easily adapted for forming circumferential welds of various diameters. This further increases the utility of the apparatus and reduces operational costs of the welding process. Third, various rollers used in the present invention cooperate to form welds of various configurations, such as circumferential and straight welds, without weld offset or mismatch.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 3:
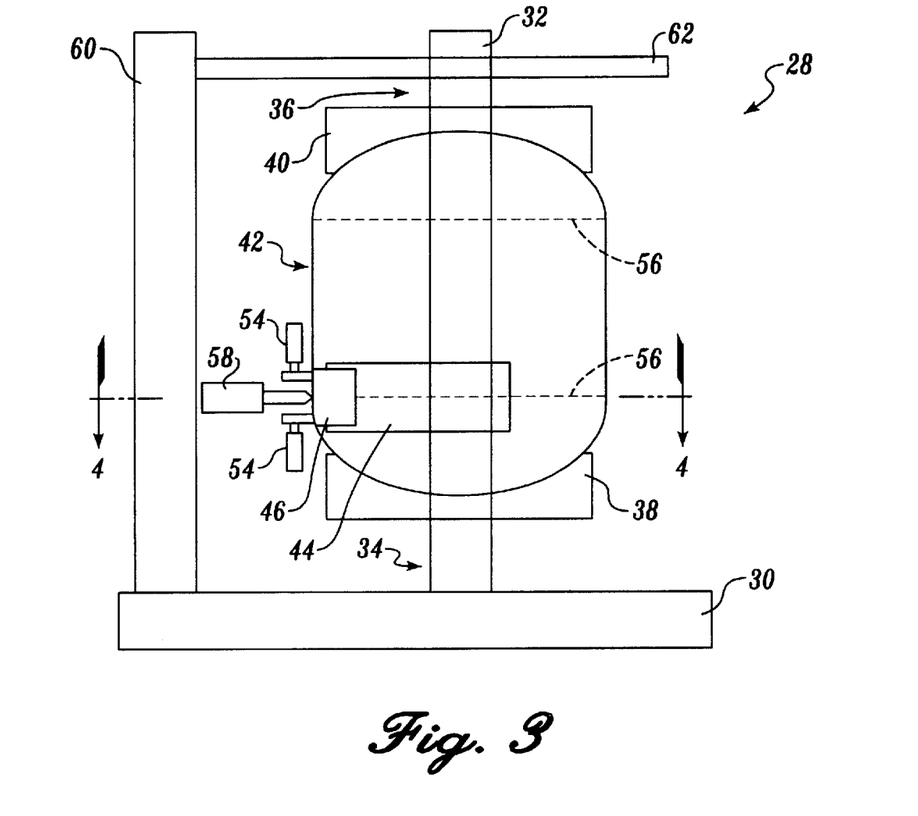
FIG. 3 is a schematic vertical cross-sectional view of an embodiment of a welding apparatus for joining a circumferential weld formed in accordance with the invention.
Figure 4:
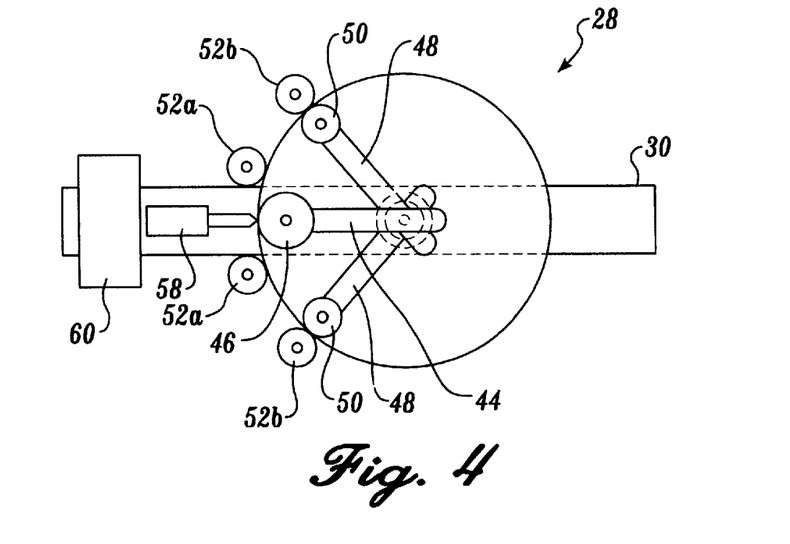
FIG. 4 is a schematic horizontal cross-sectional view of the welding apparatus of FIG. 3.

FIG. 3 is a schematic vertical cross-sectional view of an embodiment of a welding apparatus formed in accordance with the invention, and FIG. 4 is a schematic horizontal cross-sectional view along line 4—4 of the welding apparatus of FIG. 3. This embodiment is designed for forming a circumferential weld. Referring to both FIGS. 3 and 4, a preferred embodiment of the welding apparatus 28 includes a rectangular base 30 and a spindle 32 extending perpendicularly from the base 30. Along the spindle 32, at its proximal portion 34 and its distal portion 36, a first workpiece supporter 38 and a second workpiece supporter 40 are secured to spindle 32, respectively, to securely retain workpieces to be welded together, collectively represented by 42, therebetween. Between the first and second workpiece supporters 38, 40, a first arm 44 extends perpendicularly from the spindle 32. An internal backup roller 46 that is made of stainless steel is rotatably attached to a distal end of the first arm 44. Also between the first and second workpiece supporters 38, 40, two second arms 48 extend perpendicularly from the spindle 32. An internal drive roller 50 that is made of stainless steel is rotatably attached to a distal end of each second arm 48. The apparatus 28 further includes one or more external rollers 52a, 52b, each rotatably supported adjacent an external surface of the workpieces by means such as rigid beams (not shown). The external rollers 52a, 52b are made of the same material as the internal drive rollers 50. One or more external rollers 52a are provided adjacent the internal backup roller 46, and one or more external rollers 52b are provided to oppose the internal drive rollers 50. At least some of the internal and external rollers 46, 50, 52a, 52b are driven by programmable motors 54, as more fully described below.

The first and second workpiece supporters 38, 40 serve to hold the workpieces 42 in place during the welding process, and can be configured in various ways to serve the purpose. As described below, the workpieces 42 to be welded together are either rotated around the spindle 32, or held stationary. In either event, the first and second workpiece supporters 38, 40 hold the workpieces 42 stationary relative to the workpiece supporters. To accommodate workpieces of various configurations, the supporters 38, 40 are mounted to the spindle 32 in a slidably adjustable manner. To sandwich workpieces to be welded together therebetween, the supporters 38, 40 may be made removable from the spindle 32. For example, as illustrated in FIG. 3, the supporters 38, 40 may comprise a first bracket and a second bracket, each having a central opening for allowing the proximal portion 34 and the distal portion 36 of the spindle 32 to pass therethrough.

In one embodiment, once placed in position, the workpiece supporters 38, 40 are secured to the spindle 32. Thus, when the spindle 32 rotates, the workpiece supports 38, 40 rotate with it while retaining the workpieces 42 therebetween. Alternatively, the workpiece supporters 38, 40 may be coupled to the spindle 32 so as to remain stationary as the spindle 32 rotates, while holding stationary the workpieces 42 therebetween. Though in FIG. 3 the workpiece supporters 38, 40 are illustrated to have a shape that mates with the workpieces 42, the configuration of the workpiece supporters 38, 40 is not limited to this embodiment as long as it serves to support the workpieces 42 during the welding process.

The first arm 44 and the second arms 48 all have adjustable length, so that the apparatus 28 may be used to form circumferential welds 56 in workpieces having various diameters. By providing arms 44 and 48 of adjustable length, apparatus 28 can be used to weld together cylindrical or domelike workpieces 42 of variable radii by adjusting the length of the first and second arms 44, 48 to the preferred radius.

One or more second arms 48 may be provided. A preferred number of second arms is determined based on the material and the sizes of workpieces being welded together. For example, as illustrated in FIG. 4, two second arms 48, each having an internal drive roller 50 at its distal end, sandwiching a first arm 44 therebetween, serve to securely position the workpieces being welded together. In this regard, both first and second arms 44, 48 preferably are attached to the spindle 32 in a pivotally adjustable manner, so that an included angle between any two arms can be adjusted to optimally hold workpieces in place. Once positioned, the first and second arms 44, 48 are secured in place with respect to each other during the welding process. As more fully described below, the first and second arms 44, 48 may be coupled to the spindle 32 so as to either rotate with the spindle 32, or remain stationary as the spindle 32 rotates, depending on the application.

Furthermore, preferably the first and second arms 44, 48 are attached to the spindle 32 in a slidably adjustable manner, so that the apparatus 28 can be used to form a circumferential weld 56 at a varying distance from the base 30.

The internal backup roller 46 supported by the first arm 44 is capable of opposing significant forces created by friction stir welding cylindrical or domelike workpieces 42, as discussed above. The internal backup roller 46 provides a single contact point along the weld line between the workpieces 42. The internal backup roller 46, in combination with the other rollers 50, 52a, 52b and workpiece supporters 38, 40, cooperates to eliminate the need for a rigid support adjacent a proposed weld line along its entire circumference.

As best illustrated in FIG. 4, one or more external rollers 52a are preferably positioned adjacent the internal backup roller 46. When the external rollers 52a are provided in this configuration, a clamping force is created so as to minimize the offset between the workpieces during the welding process. The external rollers 52a serve to react to the forces that are created by a rotating friction stir welding probe, which is often applied at a slight angle, to lift the workpieces 42 being joined off the internal backup roller 46.

Furthermore, additional external rollers 52b are provided to oppose the internal drive rollers 50, so that the rollers cooperatively clamp the workpieces 42 being joined together. This arrangement not only securely holds the workpieces 42 together, but also serves to join the workpieces 42 together without offset or mismatch prior to and after the welding process, thus ensuring a positive weld around the circumference of the workpieces.

The programmable motors 54 preferably have variable speeds, so that the workpieces 42 being welded together can be continuously drawn between the friction stir welding tool 58 and the internal backup roller 46 at a controlled rate, depending on the material and configuration of the workpieces 42. All the internal and external rollers 46, 50, 52a, 52b may be driven by the programmable motors 54. In the alternative, only the internal rollers 46, 50 may be driven by the motors, while the external rollers 52a, 52b are disposed to idle along with the internal rollers. Likewise, only the external rollers 52a, 52b may be driven by the motors, while the internal rollers 46, 50 are disposed to idle along.

It should be understood that positioning of the motors 54 is not limited to what is schematically illustrated in FIG. 3. Various other arrangements of the motors 54 can be made easily, according to each welding operation, as long as they drive at least some of the rollers 46, 50, 52a, 52b to continuously draw the workpieces 42 between the friction stir welding tool 58 and the internal backup roller 46, or cause the rollers 46, 50, 52a, 52b to travel along a proposed weld line on the workpieces 42.

Additionally, for structural soundness purposes, the apparatus 28 may further include a support shaft column 60 that extends perpendicularly from the base 30, and a support shaft 62 that extends perpendicularly from a distal end of the column 60 and joins perpendicularly with a distal end of the spindle 32. In this configuration, the column 60 extends in parallel with, and spaced apart from, the spindle 32, and the shaft 62 extends in parallel with, and spaced apart from, the base 30.

Figure 5:
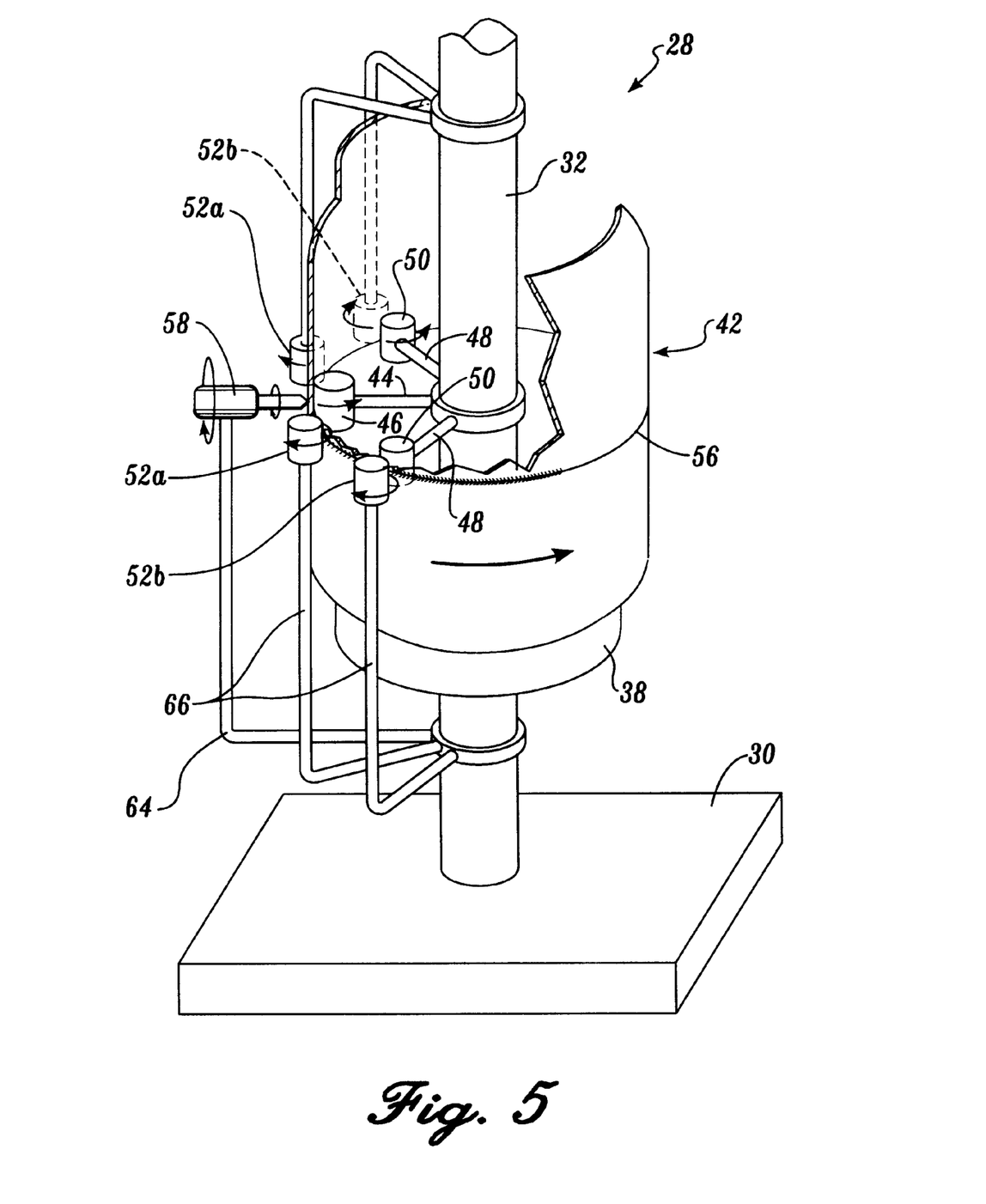
FIG. 5 is a schematic cutaway view of the welding apparatus of FIGS. 3 and 4, illustrating various rollers driven by programmable motors cooperatively supporting and drawing the workpieces between the friction stir welding tool and the internal backup roller.

FIG. 5 is a schematic cutaway view of the welding apparatus 28 as described above, illustrating various rollers 46, 50, 52a, 52b driven by programmable motors (not shown) cooperatively supporting the workpieces 42 being joined together. The internal backup roller 46 serves as a single contact point to react to significant forces created by friction stir welding of a circumferential weld 56.

As schematically illustrated in FIG. 5, an external support for supporting an external roller 52a, 52b can be integral with a unit 64 that supports the friction stir welding tool 58.

An external support may be an external arm 66, having an adjustable length, coupled to the spindle 32 either integrally with or separately from the welding tool 58. The above examples of an external support are given to illustrate the various configurations available to hold an external roller 52a, 52b in position.

Referring jointly to FIGS. 3 and 5, the welding apparatus 28 of the present invention is described in operation. Cylindrical or domelike workpieces 42 to be welded together are coaxially mounted onto the apparatus 28, with their axes being aligned with the spindle 32. The first and second workpiece supporters 38, 40 are positioned above and below the workpieces. Positions of the first and second arms 44, 48 are slidably adjusted along the spindle 32, according to a preferred location where the rollers overlap the circumferential weld 56 to be formed. The workpieces 42 are sandwiched between the internal rollers 46, 50 and the external rollers 52a, 52b, with a proposed circumferential weld line 56 preferably roughly aligned with a middle circumference of the rollers 46, 50, 52a, 52b. While this alignment is preferable, for it ensures that a clamping force is applied equally on both sides of the weld line, the location of a proposed weld line relative to the roller may vary depending on each application. A friction stir welding tool 58 is positioned outside the workpieces 42 with its probe being placed on the proposed weld line 56 and opposing the internal backup roller 46.

In one embodiment, as the motors 54 drive at least some of the rollers 46, 50, 52a, 52b to continuously feed the workpieces 42 between the friction stir welding tool 58 and the internal backup roller 46, the friction stir welding tool 58, which itself is held stationary together with the apparatus 28 of the invention, forms a weld 56 along a circumference of the workpieces 42 being joined together. In this embodiment, as the spindle 32 rotates, the workpiece supporters 38, 40 rotate with it while retaining the workpieces 42 therebetween.

In another embodiment, the friction stir welding tool 58, together with the apparatus 28 of the invention, is rotated with the spindle 32, while the workpieces 42 being joined are held stationary, to form a circumferential weld. In this case, as the first, second, and external arms 48, 50, 66 rotate with the spindle 32, the first and second workpiece supporters 38, 40 remain stationary and hence the workpieces 42 that are retained therebetween. Those skilled in the art can easily effect both embodiments, as described above, depending on the particular application.

The arrangement of the rollers serves to form a weld without offset or mismatch of the workpieces 42 being joined, prior to, during, and after the welding process. In particular, the external rollers 52a that are positioned adjacent the internal backup roller 46, in a manner sandwiching the friction stir welding tool 58 therebetween, serve to accurately feed the workpieces 42 between the friction stir welding tool 58 and the internal backup roller 46 and thereby minimize weld offset.

Upon completion of the welding process, the arms 44, 48 are either removed or collapsed to be aligned with the spindle 32, in order to remove the welded workpieces 42 from the apparatus 28.

The present invention also provides a method of friction stir welding cylindrical or domelike workpieces together by forming a circumferential weld. The method includes providing a friction stir welding tool 58 and a welding apparatus 28 of the present invention, and positioning the workpieces 42 to be welded together onto the apparatus 28 as described above. The method further includes forming a circumferential weld 56 to join the workpieces 42 together by rotating the rollers 46, 50, 52a, 52b of the apparatus 28. The rotating rollers either continuously feed the workpieces 42 between the friction stir welding tool 58 and the internal backup roller 46, or travel, together with the friction stir welding tool, along the proposed weld line 56 on the workpieces 42, which are held stationary. Finally, the method includes removing the welded workpieces 42 from the apparatus 28.

The present invention is adaptable for use in forming circumferential welds of various diameters and, thus, provides a universal friction stir welding machine that will provide significant lead time and cost advantages. The invention provides a suitable method and apparatus for assembling large aluminum alloy pressurized tanks, such as cryogenic oxygen storage tanks in space launch systems.

Figure 6A:
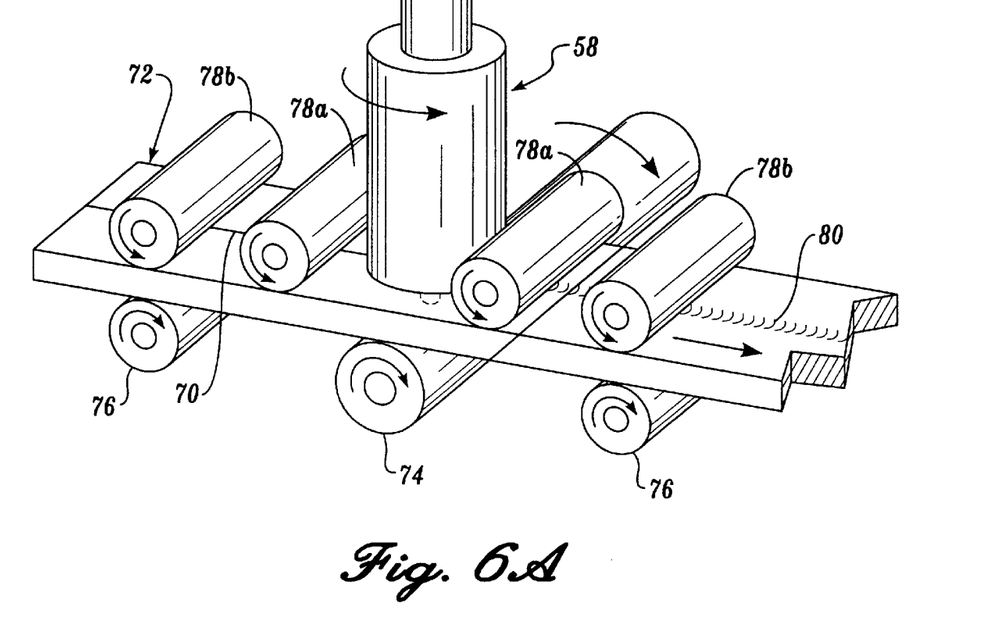
FIG. 6A is a schematic perspective view of another embodiment of the welding method of the invention, illustrating the formation of a straight longitudinal weld to join together flat workpieces without weld offset.
Figure 6B:
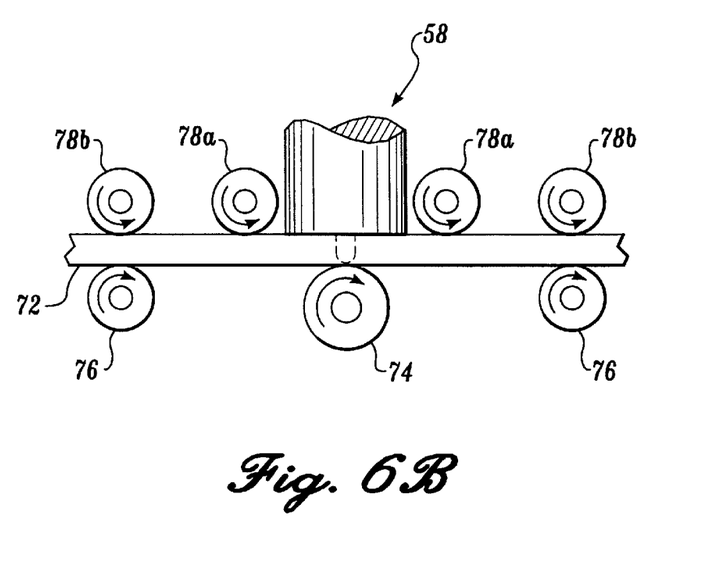
FIG. 6B is an end view of FIG. 6A.

Referring to FIGS. 6A and 6B, a further embodiment of the method of the present invention is illustrated for welding together flat workpieces while minimizing weld offset. FIG. 6A is a schematic perspective view of such method, illustrating the formation of a straight longitudinal weld 70 to join together flat workpieces, collectively represented by 72. FIG. 6B is an end view of FIG. 6A.

The method includes providing a backup roller 74 and one or more first rollers 76, all aligned in parallel with each other. The rollers 74, 76 are rotatably supported (not shown). The flat workpieces 72 to be joined are placed on the backup roller 74 and the first rollers 76, with a proposed weld line 70 preferably roughly aligned with a middle circumference of each of the rollers. The method further includes one or more second rollers 78a, 78b that are aligned in parallel with each other and rotatably supported. The second rollers 78a, 78b are placed on the flat workpieces 72, on the opposite side from the backup roller 74 and the first rollers 76, with the proposed weld line 70 preferably roughly aligned with a middle circumference of each of the rollers 78a, 78b. As before, the location of a proposed weld line relative to the roller may vary depending on each application.

It is preferable to place one or more second rollers 78a adjacent the backup roller 74 so as to minimize weld offset during the welding process, as in forming a circumferential weld as discussed above. In addition, one or more second rollers 78b may be positioned to oppose first rollers 76 so as to clamp the flat workpieces 72 together therebetween, to prevent offset or mismatch prior to, and after the welding process.

As before, at least some of the rollers are driven by programmable motors (not shown).

In operation, a friction stir welding tool 58 is positioned, on the same side as the second rollers 78a, 78b, with its probe on the proposed weld line 70 and opposing the backup roller 74. As the motors drive the rollers to continuously feed the flat workpieces 72 between the friction stir welding tool 58 and the backup roller 74, the friction stir welding tool 58 forms a straight longitudinal weld 80. As before, alternatively, the rollers 74, 76, 78a, 78b, together with the friction stir welding tool 58, may travel along the proposed weld line 70 to form a longitudinal weld, while the flat workpieces 72 are held stationary.

It should be understood that the arrangement of various rollers, arms, programmable motors, or external supports for positioning external rollers for joining a circumferential weld, is not limited to what is illustrated in FIGS. 3, 4, 5, 6A, and 6B; various arrangements are to be optimally found depending on the material and configuration of the workpieces being welded together.

While the preferred embodiments of the invention have been illustrated and described, it will be appreciated that various changes can be made therein without departing from the spirit and scope of the invention.

What is claimed is:

1. A friction stir welding apparatus for joining together workpieces along a circumferential weld line comprising:
   a base;
   a spindle extending perpendicularly from the base;
   a first workpiece supporter adjustably mounted on a proximal portion of the spindle;
   a second workpiece supporter adjustably mounted on a distal portion of the spindle;
   a first arm extending perpendicularly from the spindle between the first and second workpiece supporters;
   an internal backup roller rotatably attached to a distal end of the first arm;
   a second arm extending perpendicularly from the spindle between the first and second workpiece supporters;
   an internal drive roller rotatably attached to a distal end of the second arm;
   an external roller rotatably attached to an external support;
   programmable motors for driving at least some of the rollers; and
   a friction stir welding tool coupled to the external support.

2. The apparatus of claim 1, wherein the first arm and the second arm have adjustable length.

3. The apparatus of claim 1, wherein the programmable motors drive the internal backup roller and the internal drive roller.

4. The apparatus of claim 1, which further includes:
   a support shaft column extending perpendicularly from the base, the column being spaced apart from and extending in parallel with the spindle; and
   a shaft extending perpendicularly from a distal end of the column to join perpendicularly with a distal end of the spindle, the shaft being spaced apart from and extending in parallel with the base.

5. The apparatus of claim 1, wherein the first and second arms are attached to the spindle in a pivotally adjustable manner.

6. The apparatus of claim 1, wherein the first and second arms are attached to the spindle in a slidably adjustable manner.

7. The apparatus of claim 1, wherein the internal drive roller and the external roller oppose each other to retain the workpieces together therebetween.

8. The apparatus of claim 8, wherein two second arms are provided to sandwich the first arm therebetween, each of the second arms having at its distal end a rotatably attached internal drive roller, and two external rollers are provided to oppose each of the internal drive rollers.

9. The apparatus of claim 1, wherein one or more external rollers are provided adjacent the internal backup roller so as to cooperatively clamp the workpieces during the welding process.

10. The apparatus of claim 1, wherein the first workpiece supporter comprises a first bracket having a central opening for passing the proximal portion of the spindle through the first bracket, and the second workpiece supporter comprises a second bracket having a central opening for passing the distal portion of the spindle through the second bracket.

11. The apparatus of claim 1, wherein the first and second arms are either removable from the spindle or collapsible to be aligned with the spindle.

12. A method of friction stir welding together workpieces along a circumferential weld line, the method comprising:
   (a) providing a friction stir welding tool having a welding probe;
   (b) providing a friction stir welding apparatus comprising:
      (i) a base,
      (ii) a spindle extending perpendicularly from the base,
      (iii) a first workpiece supporter adjustably mounted on a proximal portion of the spindle,
      (iv) a second workpiece supporter adjustably mounted on a distal portion of the spindle,
      (v) a first arm extending perpendicularly from the spindle between the first and second workpiece supporters,
      (vi) an internal backup roller rotatably attached to a distal end of the first arm,
      (vii) a second arm extending perpendicularly from the spindle between the first and second workpiece supporters,
      (viii) an internal drive roller rotatably attached to a distal end of the second arm,
      (ix) an external roller rotatably attached to an external support, and
      (x) programmable motors for driving at least some of the internal and external rollers;
   (c) positioning the workpieces coaxially onto the apparatus between the first and second workpiece supporters, axes of the workpieces being aligned with the spindle, the workpieces being sandwiched between the internal and external rollers, and the first arm being positioned so that the internal backup roller opposes the friction stir welding tool probe;
   (d) friction stir welding together the workpieces using the friction stir welding tool, with the motors driving the rollers to continuously feed the workpieces between the friction stir welding tool and the internal backup roller at a controlled rate; and
   (e) removing the welded workpieces from the apparatus.

13. The method of claim 12, wherein the first and second arms have adjustable length.

14. A method of friction stir welding together workpieces along a circumferential weld line, the method comprising:
   (a) providing a friction stir welding tool having a welding probe;
   (b) providing a friction stir welding apparatus comprising:
      (i) a base,
      (ii) a spindle extending perpendicularly from the base,
      (iii) a first workpiece supporter adjustably mounted on a proximal portion of the spindle,
      (iv) a second workpiece supporter adjustably mounted on a distal portion of the spindle,
      (v) a first arm extending perpendicularly from the spindle between the first and second workpiece supporters,
      (vi) an internal backup roller rotatably attached to a distal end of the first arm,
      (vii) a second arm extending perpendicularly from the spindle between the first and second workpiece supporters,
      (viii) an internal drive roller rotatably attached to a distal end of the second arm,
      (ix) an external roller rotatably attached to an external support, and
      (x) programmable motors for driving at least some of the internal and external rollers;
   (c) positioning the workpieces coaxially onto the apparatus between the first and second workpiece supporters, axes of the workpieces being aligned with the spindle, the workpieces being sandwiched between the internal and external rollers, and the first arm being positioned so that the internal backup roller opposes the friction stir welding tool probe;

(d) friction stir welding together the workpieces using the friction stir welding tool, with the motors driving the rollers so as to cause the rollers and the friction stir welding tool to travel along the workpieces, which are held stationary; and (e) removing the welded workpieces from the apparatus.

15. The method of claim 14, wherein the first and second arms have adjustable length.

* * * * *